United States Patent
Idelson

(10) Patent No.: US 11,763,136 B2
(45) Date of Patent: Sep. 19, 2023

(54) NEURAL HASHING FOR SIMILARITY SEARCH

(71) Applicant: GSI Technology Inc., Sunnyvale, CA (US)

(72) Inventor: Daphna Idelson, Tel Aviv (IL)

(73) Assignee: GSI Technology Inc., Sunnyvale, CA (US)

( * ) Notice: Subject to any disclaimer, the term of this patent is extended or adjusted under 35 U.S.C. 154(b) by 0 days.

(21) Appl. No.: 17/795,233

(22) PCT Filed: Jun. 24, 2021

(86) PCT No.: PCT/IB2021/055598
§ 371 (c)(1),
(2) Date: Jul. 26, 2022

(87) PCT Pub. No.: WO2021/260612
PCT Pub. Date: Dec. 30, 2021

(65) Prior Publication Data
US 2023/0090262 A1    Mar. 23, 2023

Related U.S. Application Data

(60) Provisional application No. 63/043,215, filed on Jun. 24, 2020.

(51) Int. Cl.
*G06N 3/04* (2023.01)
*G06N 3/045* (2023.01)
*G06N 3/082* (2023.01)

(52) U.S. Cl.
CPC ............. *G06N 3/045* (2023.01); *G06N 3/082* (2013.01)

(58) Field of Classification Search
CPC ................................. G06N 3/045; G06N 3/082
(Continued)

(56) References Cited

U.S. PATENT DOCUMENTS

| 8,537,919 B2 | 9/2013 | Fonseka |
| 8,977,627 B1* | 3/2015 | Vijayanarasimhan ...................... G06F 18/213 707/747 |
| 2018/0253496 A1 | 9/2018 | Natchu |

FOREIGN PATENT DOCUMENTS

EP    2533176 A1    12/2012

OTHER PUBLICATIONS

Imani, et al., "Efficient Neural Network Acceleration on GPGPU using Content Addressable Memory", Design, Automation & Test in Europe Conference & Exhibition (DATE), 2017 (Year: 2017).*

(Continued)

*Primary Examiner* — Tsu-Chang Lee
(74) *Attorney, Agent, or Firm* — HEIDI BRUN ASSOCIATES LTD.

(57) ABSTRACT

A system for training a neural-network-based floating-point-to-binary feature vector encoder preserves the locality relationships between samples in an input space over to an output space. The system includes a neural network under training and a probability distribution loss function generator. The neural network has floating-point inputs and floating-point pseudo-bipolar outputs. The generator compares an input probability distribution constructed from floating-point cosine similarities of an input space and an output probability distribution constructed from floating-point pseudo-bipolar pseudo-Hamming similarities of an output space. The system includes a proxy vector set generator to take a random sampling of vectors from training data for a proxy set, a sample vector selector to select sample vectors from the training data and a KNN vector set generator to find a set of k nearest neighbors closest to each sample vector from said proxy set for a reference set.

15 Claims, 7 Drawing Sheets

(58) Field of Classification Search
USPC .......................................................... 706/26
See application file for complete search history.

(56) References Cited

OTHER PUBLICATIONS

International Search Report for application PCT/IB2021/055598 dated Oct. 14, 2021.
Lin, Ruei-Sung et al., "SPEC Hashing: Similarity Preserving Algorithm for Entropy-based Coding", In: 2010 IEEE Computer Society Conference on Computer Vision and Pattern Recognition (CVPR).
Cai, Deng, "A Revisit of Hashing Algorithms for Approximate Near Neighbor Search", In: IEEE Transactions on Knowledge and Data Engineering (2019).
Wang, Jingdong et al., "A Survey on Learning to Hash", In: IEEE Transactions on Pattern Analysis and Machine Intelligence, 40 (2017), Nr. 4, S. 769-790.
Sablayrolles, Alexandre et al., "Spreading Vectors for Similarity Search", published as a conference paper at International Conference on Learning Representations (2019).
Cao, Zhangjie et al., "HashNet: Deep Learning to Hash by Continuation", In: The IEEE International Conference on Computer Vision (ICCV), Oct. 2017.
Babenko, Artem et al., "Efficient indexing of billion-scale datasets of deep descriptors". In: Proceedings of the IEEE Conference on Computer Vision and Pattern Recognition, 2016, S. 2055-2063.
Cao, Yuan et al., "Binary hashing for approximate nearest neighbor search on big data: A survey". In: IEEE Access 6 (2017), S. 2039-2054.
Charikar, Moses S.: "Similarity estimation techniques from rounding algorithms". In: Proceedings of the thirty-fourth annual ACM symposium on Theory of computing, 2002, S. 380-388.
Deng, J. et al., "ImageNet: A Large-Scale Hierarchical Image Database". In: CVPR09, 2009.
Gong, Yunchao et al., "Iterative quantization: A procrustean approach to learning binary codes for large-scale image retrieval". In: IEEE transactions on pattern analysis and machine intelligence 35 (2012), Nr. 12, S. 2916-2929.
Indyk, Piotr et al., "Approximate nearest neighbors: towards removing the curse of dimensionality". In: Proceedings of the thirtieth annual ACM symposium on Theory of computing, 1998, S. 604-613.
Jégou, Herve et al., "Product quantization for nearest neighbor search". In: IEEE transactions on pattern analysis and machine intelligence 33 (2010), Nr. 1, S. 117-128.
Jégou, Hervé et al., "Searching in one billion vectors: re-rank with source coding". In: 2011 IEEE International Conference on Acoustics, Speech and Signal Processing (ICASSP) IEEE (Veranst.), 2011, S. 861-864.
Liu, Wei et al., "Hashing with graphs". In: ICML, URL https://icml.cc/2011/papers/6_icmlpaper.pdf, 2011, S. 1-8.
Lowe, David G.: "Distinctive image features from scale-invariant key points". In: International Journal of Computer Vision 60 (2004), Nr. 2, S. 91-110.
Malkov, Yury A. et al., "Efficient and robust approximate nearest neighbor search using hierarchical navigable small world graphs". In: IEEE transactions on pattern analysis and machine intelligence (2018).
Movshovitz-Attias, Yair et al., "No fuss distance metric learning using proxies". In: Proceedings of the IEEE International Conference on Computer Vision, 2017, S. 360-368.
Szegedy, Christian et al., "Going Deeper With Convolutions". In: Proceedings of the IEEE Conference on Computer Vision and Pattern Recognition (CVPR), Jun. 2015.
Jiang, Qing-Yuan et al., "Scalable Graph Hashing with Feature Transformation", In: Proceedings of the Twenty-Fourth International Joint Conference on Artificial Intelligence (IJCAI 2015).

* cited by examiner

NEURAL HASHING FOR SIMILARITY SEARCH

CROSS REFERENCE TO RELATED APPLICATIONS

This application is a national phase application of PCT application PCT/IB2021/055598, which claims priority from U.S. provisional patent application 63/043,215, filed Jun. 24, 2020, both of which are incorporated herein by reference.

FIELD OF THE INVENTION

The present invention relates to similarity search generally and to approximate nearest neighbor search in particular.

BACKGROUND OF THE INVENTION

Large-scale similarity search in general has become a fundamental task in recent information retrieval applications. Similarity search is a general term used for a range of techniques which share the principle of searching, typically, very large object sets, where the only available comparator is the similarity between any pair of objects. More information on similarity search may be found in the Wikipedia article 'Similarity search' found at https://en.wikipedia.org/wiki/Similarity_search.

Nearest neighbor search, in particular, is a fundamental technique that plays a crucial part in applications such as image retrieval, face recognition, document and text search and other applications. The definition of the Nearest-Neighbor (NN) search is to retrieve candidate items close to a given sample item, from a database of candidate items. Distance or proximity is defined by a distance metric such as Euclidean distance—for example L2-distance, or angular distance—or, for example, cosine similarity. K-Nearest-Neighbor (KNN) search is the retrieval of the K nearest neighbors to an item and is either used as is—for example to present results in a web search —or as a prediction algorithm for classification—using a voting method, or for regression—using an averaging method. More information on nearest neighbor search may be found in the Wikipedia article 'Nearest neighbor search' found at https://en.wikipedia.org/wiki/Nearest_neighbor_search.

NN is usually not performed on raw data like images or text, as distance between raw data values does not hold much information. Data first needs to be transformed to d-dimensional feature vectors that have a meaningful distance metric in the feature space for the task at hand. These real-valued feature vector representations are often called feature embeddings, and hopefully hold desired semantic information of the input data, so that semantically similar inputs fall close to one another in the embedding space. Such feature vectors in the same embedding space can be compared using a distance (or similarity) metric, such as cosine similarity or L2 distance.

Cosine similarity is a similarity metric between two non-zero feature vectors. It is equal to the cosine of the angle between the two vectors. This is also the same as the inner product of the same vectors normalized to both have length 1. The cosine of the two vectors can be derived using the dot product formula shown in equation 1:

$$A \cdot B = \|A\| \|B\| \cos \theta \quad (1)$$

Where $\theta$ is the angle between the two vectors A and B. More information on cosine similarity may be found in the Wikipedia article 'Nearest neighbor search' found at https://en.wikipedia.org/wiki/Cosine_similarity.

The process of converting raw input data to feature vectors, or feature embeddings, is known as feature extraction, embedding, or X2Vec (i.e., from some kind of data X to a feature vector) and there are many methods, including deep neural networks (discussed hereinbelow), domain specific feature engineering, and other machine learning methods that are used for this process. As examples, such feature extraction models can be Word2Vec for word embeddings, deep-based FaceNet for face embeddings and SIFT feature detection for pattern matching in images. Hereinafter, this process will be referred to as 'data encoding' and it is assumed that the converter is a given and its feature space similarity is desired and required to be preserved.

Reference is now made to FIG. 1 which illustrates a KNN search system 10. KNN search system 10 has a data encoder 12 and a KNN searcher 14. Data encoder 12 transforms raw data $d_i$ into floating-point data vectors $fv_i$ the vector format having a measurable quantity required for KNN search, as mentioned herein above. KNN searcher 14 can then perform a KNN similarity search on a set of vectors output by data encoder 12.

For KNN in large retrieval databases, the search in the feature representation space often requires significant computation and memory resources and imposes a performance bottleneck. As data volumes become increasingly large, containing millions and billions of items, and content search becomes a widely required task, methods for fast Approximate-Nearest-Neighbor (ANN) search, which trades off a slight loss in accuracy for large performance gains, have become the focus of extensive research. There are a number of ANN techniques, including graph-based methods, clustering methods, and Hashing methods, each of which has its own limitations when used with large datasets and different hardware.

Hashing methods aim to map data points into low-dimensional representations, or compact bit-codes, for efficient comparison and reduction of memory space. One of the most popular hashing methods is locality sensitive hashing (LSH). LSH maps high-dimensional points to low-dimensional points using a set of random projections. Though theoretically robust and efficient, also on high dimensional vectors and output code-lengths, classic LSH methods are data-independent and are in many cases empirically outperformed by data-dependent methods that exploit specific data structure and distribution.

One main group of data-dependent methods for ANN is based on binary hashing, which maps data points in the original floating-point, feature vector representation space into binary codes in the Hamming space for compact representation and fast search. Similarity search in the Hamming space is measured using Hamming distance or Hamming similarity. Hamming distance between two binary strings of equal length is the number of positions at which the corresponding symbols are different. In other words, it measures the minimum number of substitutions needed to change one binary string into the other. Hamming similarity is the inverse of Hamming distance and is the number of positions at which the corresponding symbols are similar. More information on Hamming distance may be found in the Wikipedia article 'Hamming distance' found at https://en.wikipedia.org/wiki/Hamming_distance.

Reference is now made to FIG. 2 which illustrates an ANN search system 20 which has a data encoder 12, similar to that in KNN search system 10 in FIG. 1, a floating-point to binary encoder 22, and an ANN searcher 24. Data encoder 12 encodes raw data $d_i$ into vectors $fv_i$, then floating-point to binary encoder 22 converts floating-point data vectors $fv_i$ into binary encoded data vectors $bv_i$. ANN searcher 24 then performs an approximate similarity search on a set of binary vectors.

One implementation of floating-point to binary encoder 22 uses a shallow neural network to encode vectors. It should be noted that, in vector to binary conversion, it is essential that the similarity relationships between the binary encoded vectors and the similarity relationships between the original floating-point vectors are preserved as best as possible, while finding the balance between loss in accuracy and resources, such as memory and search-time.

A brief explanation of a standard neural network follows, with respect to FIGS. 3A and 3B, which illustrate the components of a feedforward, neural network 31. Neural network 31 has an input layer 32, a plurality of hidden layers 33, and an output layer 34. Each layer is connected to the next and previous layers. Layers are made up of nodes 36; the number of layers and the number of nodes varies by input complexity and purpose of the neural network. As shown in FIG. 3B, nodes are connected to make a path from input layer 32 through to output layer 34. Connections are called edges 37. Nodes 36 and edges 37 are weighted with weightings Wn,h, where n is the node number and h is the layer number. Weight, Wn,h, adjusts the strength of the signal at that connection.

Before a neural network can be used, it needs to be trained to perform a specific feature extraction task. Training is a process by which weights, Wn,h, are adjusted throughout the network, using example data called training data, until the network operates as expected. Data sets available for neural networks are divided into training, validation and test sets, so that the neural network can use different data sets during different phases of the training and evaluation processes. At the start of training, the network weights are randomly initialized, and then adjusted according to a defined error, called the loss or cost function, between a desired output and the actual output. This is an iterative process called gradient descent through back propagation. More detail may be found in the Wikipedia article "Artificial neural network", stored at https://en.wikipedia.org/wiki/Artificial_neural_network.

Such a forward and backward pass performed to adjust the neural network's weights is called an iteration. An iteration may be performed simultaneously on a plurality of samples from the training set, called a batch or mini-batch, and the number of samples is called the batch size. The number of times the entire training set is passed through the network is known as the number of epochs.

Once training and verification is completed, the network may be used operationally on unknown inputs, in what is known as 'inference' mode. It should be noted that during training, special layers may be present in the network to facilitate training and loss function generation, and these may be removed and other non-parametric layers that are required for inference added prior to operation.

SUMMARY OF THE PRESENT INVENTION

There is provided, in accordance with a preferred embodiment of the present invention, a method for training a neural-network-based floating-point to binary feature vector encoder to preserve the locality relationships between samples in an input space over to an output space. The method includes having a neural network under training which has floating-point inputs and floating-point pseudo-bipolar outputs, and generating a loss function which compares an input probability distribution constructed from floating-point cosine similarities of the input space and an output probability distribution constructed from floating-point pseudo-bipolar pseudo-Hamming similarities of the output space.

Moreover, in accordance with a preferred embodiment of the present invention, the generating includes calculating the output probability distribution between a floating-point pseudo-bipolar encoded sample vector and a set of pseudo-bipolar encoded reference vectors.

Further, in accordance with a preferred embodiment of the present invention, the method also includes taking a random sampling of a plurality of vectors from a training vector set, thereby to generate a representative proxy vector set, selecting the sample vector from the training vector set, and finding a set of k nearest neighbor vectors from the proxy vector set, closest to the sample vector, thereby to generate a reference vector set to be encoded by the encoder.

Still further, in accordance with a preferred embodiment of the present invention, the method includes repeating the taking for each training iteration.

Moreover, in accordance with a preferred embodiment of the present invention, the method includes repeating the selecting multiple times per training iteration thereby generating a plurality of sample vectors for each training iteration.

Further, in accordance with a preferred embodiment of the present invention, the method also includes repeating the finding thereby generating a plurality of the reference vector sets, one per sample vector of the plurality of sample vectors, for each training iteration.

Still further, in accordance with a preferred embodiment of the present invention, the generating includes calculating the loss function using a Kullback-Leibler divergence from the input probability distribution and the output probability distribution.

Additionally, in accordance with a preferred embodiment of the present invention, for training, the neural network includes an output layer which generates the floating-point pseudo bipolar encoded sample and reference vectors using a beta-scaled tan h layer.

Moreover, in accordance with a preferred embodiment of the present invention, the generating includes calculating the pseudo-Hamming similarities using an inner product in the output space.

Further, in accordance with a preferred embodiment of the present invention, the generating includes normalizing the cosine similarities and the pseudo-Hamming similarities to be within the same range of values.

Still further, in accordance with a preferred embodiment of the present invention, the normalizing includes normalizing the pseudo-Hamming similarities using a binary code length.

Moreover, in accordance with a preferred embodiment of the present invention, the normalizing includes converting the cosine similarities and the pseudo-Hamming similarities to probabilities.

Additionally, in accordance with a preferred embodiment of the present invention, the method includes, once the neural network is trained, producing an inference neural network from the trained neural network, the inference neural network to output true binary vectors.

Further, in accordance with a preferred embodiment of the present invention, the producing includes removing pseudo-bipolar output layers from the trained neural network, and adding at least one binary output layer to the trained neural network, to generate the inference neural network.

Additionally, in accordance with a preferred embodiment of the present invention, the true binary vectors are to be used in approximate nearest neighbor searches.

There is also provided, in accordance with a preferred embodiment of the present invention, a system for training a neural-network-based floating-point to binary feature vector encoder to preserve the locality relationships between samples in an input space over to an output space. The system includes a neural network under training and a probability distribution loss function generator. The neural network under training has floating-point inputs and floating-point pseudo-bipolar outputs. The probability distribution loss function generator generates a loss function which compares an input probability distribution constructed from floating-point cosine similarities of the input space and an output probability distribution constructed from floating-point pseudo-bipolar pseudo-Hamming similarities of the output space.

Moreover, in accordance with a preferred embodiment of the present invention, the probability distribution loss function generator includes a pseudo-bipolar Hamming distribution calculator to calculate the output probability distribution between a floating-point pseudo-bipolar encoded sample vector and a set of pseudo-bipolar encoded reference vectors.

Further, in accordance with a preferred embodiment of the present invention, the system includes a training data vector store to store a training vector set, a proxy vector set generator, a sample vector selector and a KNN vector set generator. The proxy vector set generator takes at least a random sampling of a plurality of vectors from the training vector set, thereby to generate a representative proxy vector set. The sample vector selector selects at least a sample vector from the training vector set. The KNN vector set generator finds at least a set of k nearest neighbor vectors from the proxy vector set, closest to the sample vector, thereby to generate at least a reference vector set to be encoded by the encoder.

Moreover, in accordance with a preferred embodiment of the present invention, the proxy vector set generator takes a random sampling of a plurality of vectors from the training vector set, thereby to generate a representative proxy vector set for each training iteration.

Further, in accordance with a preferred embodiment of the present invention, the sample vector selector selects a plurality of the sample vectors from the training vector set, for each the training iteration.

Still further, in accordance with a preferred embodiment of the present invention, the KNN vector set generator finds, per training iteration, a plurality of the set of k nearest neighbor vectors from the proxy vector set, one per sample vector of the plurality of sample vectors for each the training iteration.

Moreover, in accordance with a preferred embodiment of the present invention, the loss function is a Kullback-Leibler divergence.

Further, in accordance with a preferred embodiment of the present invention, for training, the neural network under training includes a pseudo-bipolar output layer which generates the floating-point pseudo bipolar encoded sample and reference vectors using a beta-scaled tan h layer.

Still further, in accordance with a preferred embodiment of the present invention, the probability distribution loss function generator calculates the pseudo-Hamming similarities using an inner product in the output space.

Additionally, in accordance with a preferred embodiment of the present invention, the neural-network-based floating-point to binary encoder is a modified version of the trained neural network under training with at least one binary output layer instead of pseudo-bipolar output layer.

Further, in accordance with a preferred embodiment of the present invention, the output of the at least one binary output layer is to be used in approximate nearest neighbor searches.

Still further, in accordance with a preferred embodiment of the present invention, the probability distribution loss function generator normalizes the cosine similarities and the pseudo-Hamming similarities to be within the same range of values.

Moreover, in accordance with a preferred embodiment of the present invention, the probability distribution loss function generator normalizes the pseudo-Hamming similarities using a binary code length.

Finally, in accordance with a preferred embodiment of the present invention, the probability distribution loss function generator converts the cosine similarities and the pseudo-Hamming similarities to probabilities.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
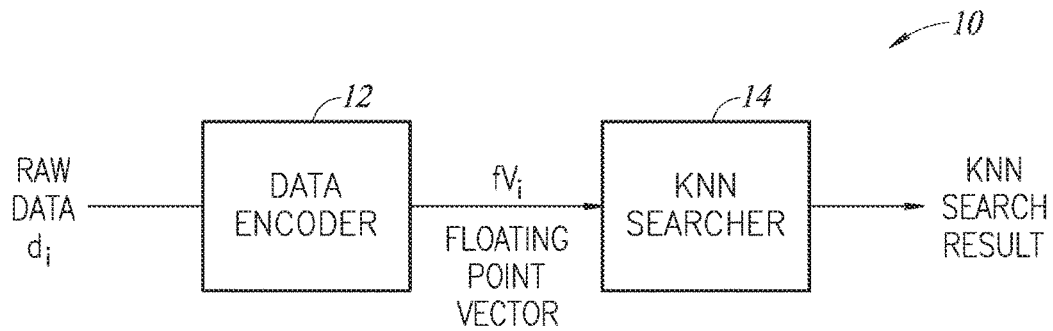
FIG. 1 is a schematic illustration of a prior art K nearest neighbor search system.
Figure 2:
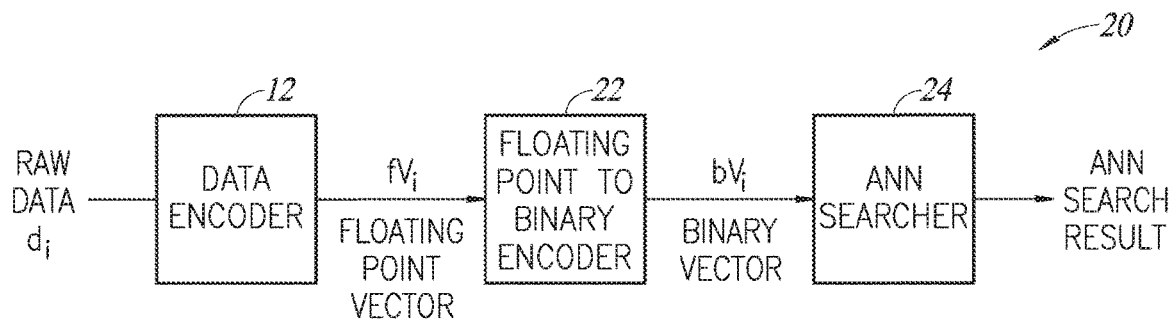
FIG. 2 is a schematic illustration of a prior art approximate nearest neighbor search system.
Figure 3A:
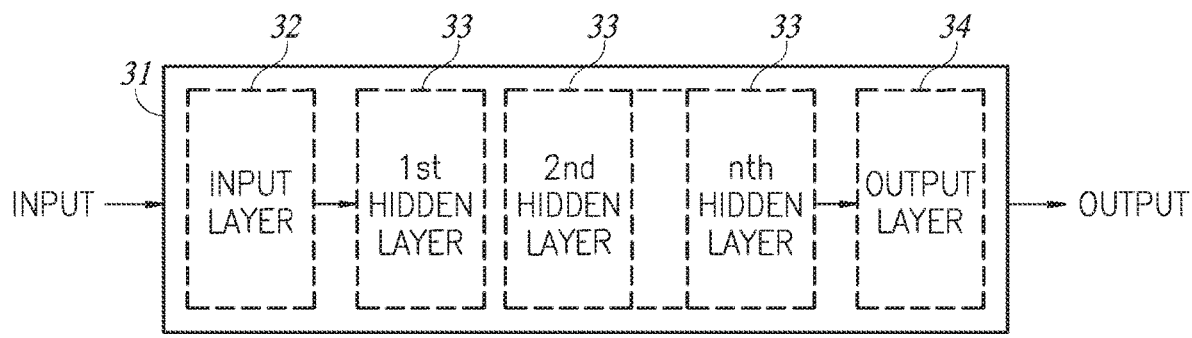
FIGS. 3A and 3B are schematic illustrations of a prior art neural network.
Figure 3B:
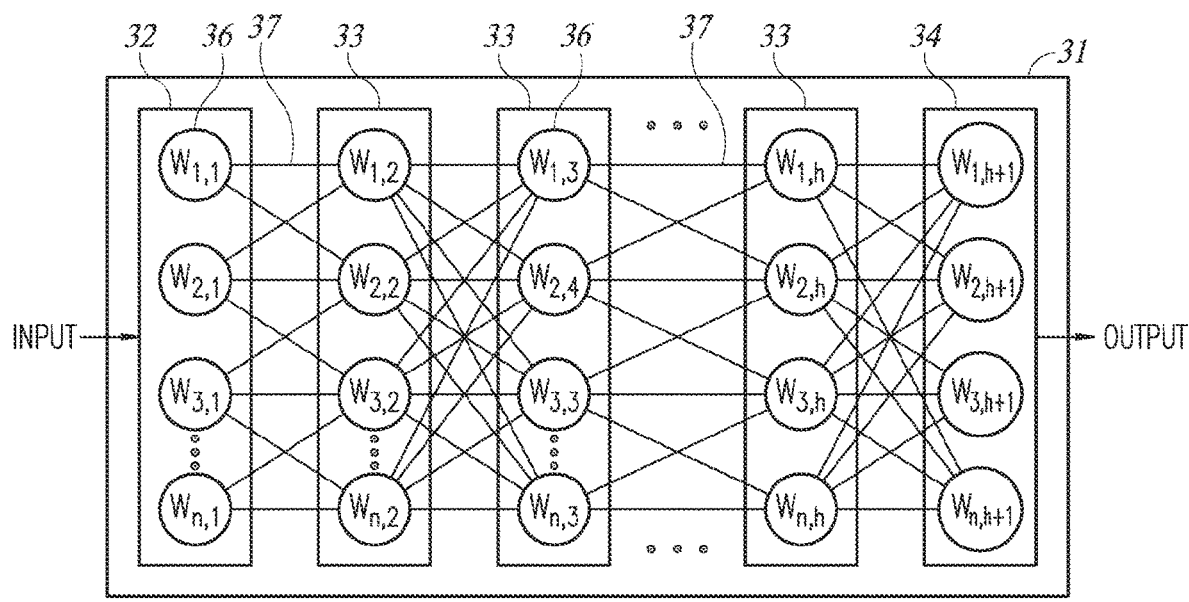

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Applicant has realized that the speed and quality of any approximate nearest-neighbor (ANN) similarity search may be increased by improving the preservation of the locality relations between the original floating-point data vectors and the locality relations between the output binary vectors during binary encoding by a neural binary hashing (NPH) encoder.

Applicant has realized that the performance of such a NPH encoder may be improved by a novel calculation of the loss function, by a comparison of an output pseudo-bipolar Hamming probability distribution to an input cosine probability distribution.

As back propagation of the loss function for weight update uses partial derivatives, it is essential that during training the operations used to calculate the loss through the network are differentiable. Applicant has realized that, for optimizing the encoding of binary output vectors at inference time, during training they may be represented as floating point pseudo-bipolar vectors. The training process trains the NPH encoder so as to achieve output pseudo-bipolar values which strive to either −1 or +1. As mentioned hereinabove, the system architecture of the NPH encoder during training may be different to that of the NPH encoder used during inference, which in turn will encode to real bipolar or binary vectors.

Figure 4A:
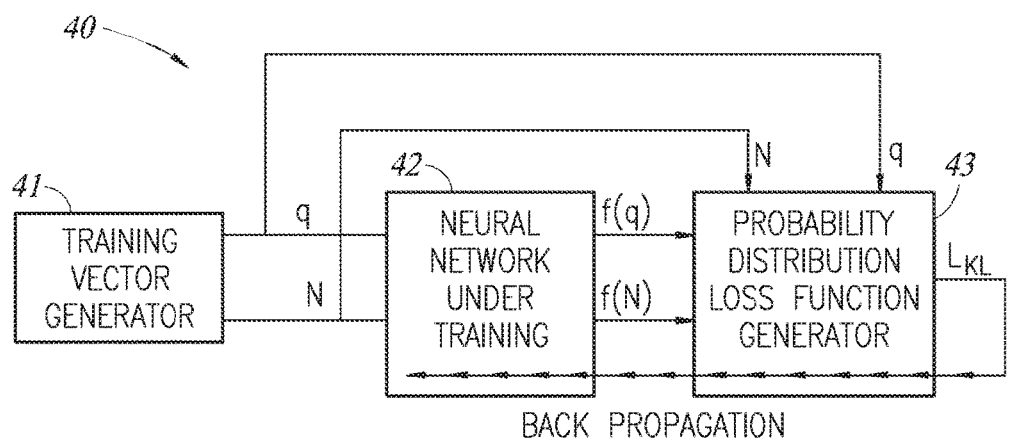
FIG. 4A is a schematic illustration of a model of a neural proxy hash (NPH) encoder during training, constructed and operative in accordance with a preferred embodiment of the present invention.

Reference is now made to FIG. 4A which illustrates a model of a NPH encoder during training. Training model 40 comprises a training vector generator 41, a neural network under training 42 and probability distribution loss function (PDLF) generator 43. In the training scenario, training vector generator 41 may generate a sample floating-point vector q and a set N of k floating-point reference vectors $v_i$, which are input into neural network under training 42. Neural network under training 42 may encode input vector q and input vector set N into a pseudo-bipolar encoded sample vector f(q) and a set of pseudo-bipolar encoded reference vectors f(N), respectively. PDLF generator 43 may generate a loss function $L_{KL}$ for neural network under training 42 as a function of the pseudo-bipolar Hamming space probability distribution between pseudo-bipolar encoded output sample vector f(q) and pseudo-bipolar encoded output reference vector set f(N), and the cosine space probability distribution between input sample vector q and input reference vector set N, as explained hereinbelow. As mentioned hereinabove, loss function Liu may then be used to adjust the weights of neural network under training 42 at each iteration of the training process. However, during inference, neural network under training 42 may be reconfigured to output true binary vectors, as explained hereinbelow.

It should be noted that during training, training vector generator 41 may output a plurality b of sample vectors $q_j$, and a plurality of associated reference vector sets $N_j$, for every training iteration. The batch size b is a configurable hyper-parameter commonly used in machine learning. The error, or loss, is calculated for each vector $q_j$ against its reference vector set $N_j$ and the total loss function is defined as the mean across all $q_j$ in the iteration. The back propagation process including partial derivative calculations and weights update may be performed by the neural network framework being used, for example TensorFlow, PyTorch or MxNet. The gradient descent method of optimization (e.g., SGD, Adam optimizer, etc.) and standard NN training hyperparameters such as learning rate, scheduling and momentum, may be configured via the neural network framework.

Training iterations may continue until all vectors from a training vector set T have been used as a sample vector q. This is known as an epoch. Training set T may be passed through the network under training multiple times until the loss function converges and the network is fully trained. The number of times the entire training vector set T is passed through the network is known as the number of epochs.

Figure 4B:
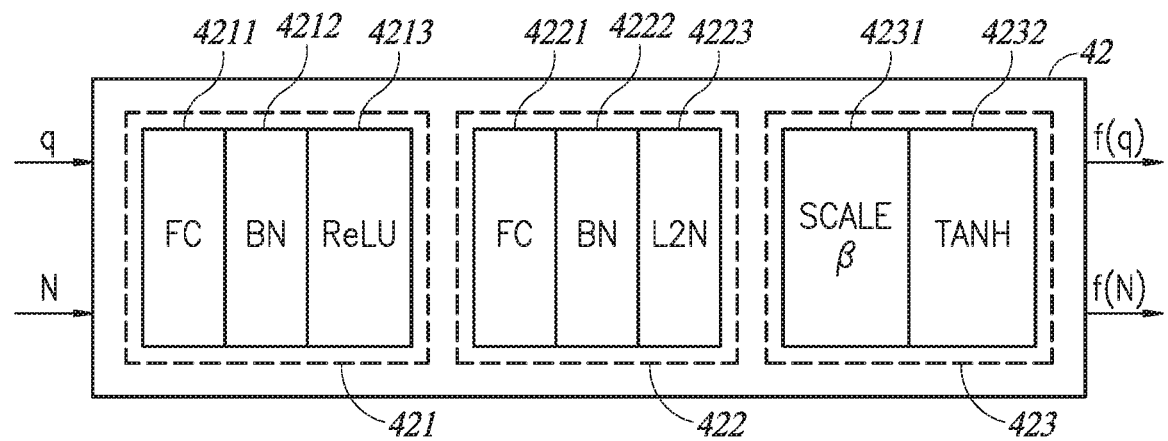
FIG. 4B is a schematic illustration of a neural network under training, useful in the NPH encoder of FIG. 4A.

Reference is now made to FIG. 4B which details neural network under training 42 comprising a configurable number of hidden layers 421, a final embedding layer 422, and a bipolar simulator layer 423. For example, each hidden layer 421 may comprise a dense layer (FC) 4211 with a configurable number of units, a batch normalization (BN) layer 4212, and a ReLU activation layer 4213. Embedding layer 422 may comprise a dense layer (FC) 4221 with n number of units, n being the final desired code-length of the binary vectors, a BN layer 4222 and an L2-normalizer layer 4223. As mentioned hereinabove, neural network 42 may be designed to output a pseudo-bipolar output vector, which may be used in the training phase. To this end, embedding layer 422 may create an L2-normalized, floating-point representation vector as an output. In order to simulate a bipolar vector {−1, +1}, the output embedding from embedding layer 422 may then undergo a relaxation of the non-differential sgn function, using a β-scaled function 4231 and a hyperbolic tangent function (tan h) 4232, in bipolar simulator layer 423.

It will be appreciated that the chosen code length n is configurable and should take into consideration the tradeoff between a number of factors, such as database size, required accuracy, memory resources and required search time throughput and latency.

Figure 4C:
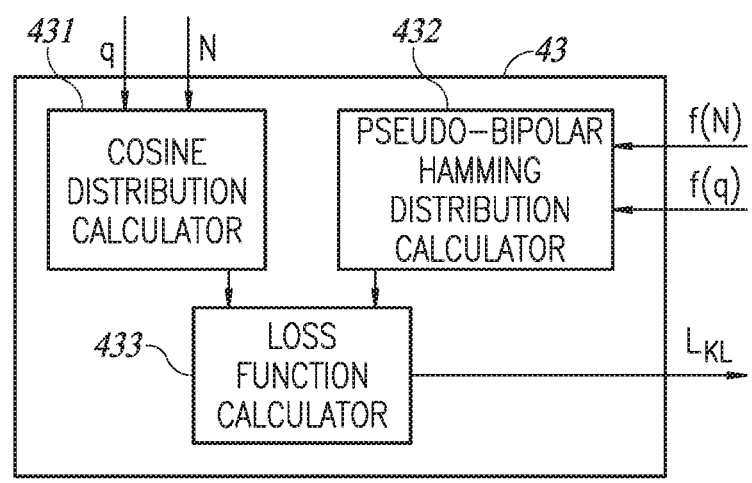
FIG. 4C is a schematic illustration of a probability distribution loss function (PDLF) generator, useful in the NPH encoder of FIG. 4A.

Reference is now made to FIG. 4C which details PDLF generator 43. Generator 43 comprises a cosine space probability distribution calculator 431, a pseudo-bipolar Hamming space probability distribution calculator 432 and a loss function calculator 433. Generator 43 may operate on all sample vectors $q_j$ in a batch. However, to simplify the equations below, the following text will describe the operation for a single sample vector q and its associated reference set N (unless noted otherwise).

Figure 4D:
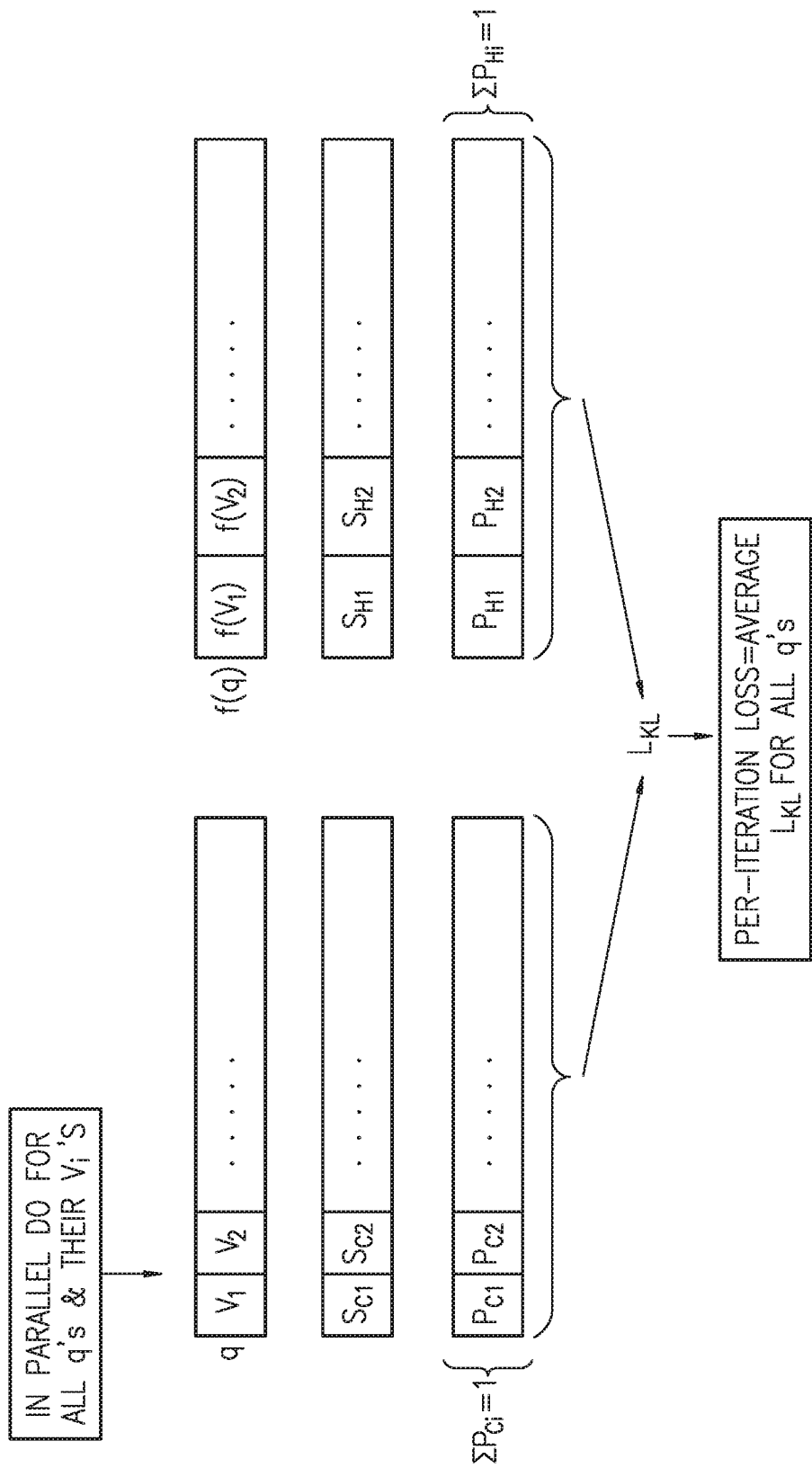
FIG. 4D is a schematic illustration detailing the vectors being operated on by the PDLF generator of FIG. 4C.

Reference is also made to FIG. 4D, which details the vectors being operated on by PDLF generator 43. In its left column, FIG. 4D shows the operations on set N of associated reference vectors $v_i$ for sample vector q and in its right column, FIG. 4D shows the operations on the pseudo-bipolar encoded output set f(N) of associated reference vectors $f(v_i)$ for pseudo-bipolar encoded sample vector f(q).

As mentioned hereinabove, in the training scenario, cosine distribution calculator 431 may determine the probability distribution of the cosine similarities $S_{Ci}$ between sample floating-point vector q and its k associated floating-point reference vectors $v_i$ in set N.

The cosine similarity $S_{Ci}$ for one reference vector $v_i$ is defined as a function of the inner product between vector q and vector $v_i$ and their norms, as provided in equation 2.

$$S_{Ci}(q \cdot v_i) = \frac{q \cdot v_i}{\|q\|\|v_i\|} \quad (2)$$

For simplicity, the input vectors may be preprocessed to undergo an L2-normalization prior to entering the network and loss computation so that $\|q\|=1$ and $\|v_i\|=1$.

Cosine distribution calculator 431 may then convert the cosine similarities $S_{Ci}$ (shown as a vector of different width elements in the second row of FIG. 4D) to a similarity probability distribution $PD_C$ for sample q by first defining the probabilities $P_{Ci}$ of q over its associated reference set N. As shown in the third row of FIG. 4D, the input probability distribution $PD_C$ is a vector of the k per-reference vector probabilities $P_{Ci}$, each determined in a manner similar to a "softmax" function, as shown in equation 3:

$$P_{Ci} = \frac{e^{S_{Ci}(q,v_i)}}{\sum_{m=1}^{k} e^{S_{Cm}(q,v_m)}} \quad (3)$$

where the softmax function takes k real numbers and normalizes them into a probability distribution consisting of k probabilities proportional to the exponentials of the real numbers. As a result, the set of probabilities $P_{Ci}$ sum to 1.

Applicant has realized that, in order to preserve relational similarities of the encoded vectors in a binary Hamming space, rather than in a cosine space, during training, normalized pseudo-Hamming similarities may be used to simulate a real Hamming similarity. Applicant has also realized that the pseudo-Hamming similarities may be calculated from the pseudo-bipolar vectors in a differential manner using the inner product, as follows:

The pseudo-Hamming similarity $S_H$, for two encoded output vectors f(q) and f($v_i$) in the pseudo-bipolar {−1, +1} space, may be defined by the inner product of the pseudo-bipolar vectors f(q) and f($v_i$), as provided in equation 4.

$$H_i(f(q), f(v_i)) = \# \text{ of identical bit positions} = \frac{f(q) \cdot f(v_i) + n}{2} \quad (4)$$

where n is the binary code length of the encoded vectors, which is the dimension of the output pseudo-bipolar vectors during training, as described hereinabove. The vector of pseudo-Hamming similarities Sit are shown on the right side of the second row of FIG. 4D.

Applicant has realized that, to ensure that the similarities of the original input space and the output space are within the same range of values, assuming pseudo-bipolar values, the output similarity scores may be normalized to the range of (−1, +1), using the binary code length n. Hence, the normalized pseudo-Hamming similarity $S_{Hi}$ between a pseudo-bipolar encoded vector of sample q, f (q), and a pseudo-bipolar encoded vector of reference point $v_i$, f ($v_i$), is defined as in equation 5.

$$S_{Hi}(f(q), f(v_i)) = 2 * \frac{H(f(q), f(v_i))}{\alpha n} - 1 = \frac{f(q) \cdot f(v_i)}{\alpha n} \quad (5)$$

Where a is a configurable correction factor that may be fine-tuned during the training for optimized accuracy and depends mainly on the range of values of the input feature vectors within the dataset and the β-scale in function 4231.

Pseudo-bipolar Hamming distribution calculator 432 may then utilize the pseudo-Hamming similarity $S_{Hi}$ to construct a pseudo-Hamming similarity probability distribution for encoded pseudo-bipolar vector f (q) of sample q by first defining the probabilities $P_{Hi}$ of q over its associated reference set N. The vector of probabilities $P_{Hi}$ defines the pseudo-bipolar Hamming probability distribution $PD_H$ and is shown on the right side of the third row of FIG. 4D.

Each pseudo-bipolar Hamming probability is determined according to equation 6 as follows:

$$P_{Hi} = \frac{e^{S_{Hi}(f(q),f(v_i))}}{\sum_{m=1}^{k} e^{S_{Hm}(f(q),f(v_m))}} \quad (6)$$

As for the cosine similarities, the probability for one encoded reference vector f($v_i$) is normalized into a probability. As a result, the set of probabilities $P_{Hi}$ sum to 1.

The input cosine distribution $PD_C$ and the output pseudo-bipolar Hamming distribution $PD_H$ may be used by the loss function calculator 433 to calculate the probability distribution loss function $L_{KL}$, using the Kullback-Leibler divergence, D, also called the relative entropy. Kullback-Leibler divergence is a measure of how the output probability distribution is different from the input or "target" probability distribution. In equation 7, loss function $L_{KL}$ for sample q is defined using the Kullback-Leibler divergence, which, as shown in FIG. 4D, utilizes the input and output probability distributions $P_{Ci}$ and $P_{Hi}$ vis-á-vis query q.

$$L_{KL} = \sum_{i=1}^{k} P_{Ci} \log \frac{P_{Ci}}{P_{Hi}} \quad (7)$$

This minimization objective for creating binary, locality preserving vectors may be described as an explicit, multi-wise normalized KL divergence loss, where "explicit" refers to using relations between distances rather than implicitly using some space partitioning method, such as labels; "multi-wise" refers to using multiple reference points which preserve relations among more than two or three items; and "normalized" refers to similarity-to-similarity divergence minimization.

It will be appreciated that the present invention may attempt to optimize the pseudo-Hamming similarity in the output space in a differential, rather than continuous, way and it does so by using an inner product between f(q) and f($v_i$).

As mentioned hereinabove, in the case where there are multiple samples $q_j$ per batch, loss function calculator 433 may calculate equation 7 for each sample $q_j$ and may average the multiple losses to form a total mean loss function. This is shown in FIG. 4D as a loop over the next sample q and its reference vectors $v_i$ with the final output as the average value of the $L_{KL}$s. In an alternative, preferred embodiment, loss function calculator 433 may generate the loss functions for all samples $q_j$ in parallel, after which, loss function calculator 433 may determine their average value to form the total mean loss function.

Applicant has realized that, to generate a meaningful similarity distribution around any query q, using meaningful points around q, such as its k nearest neighbors, as reference points to q may be most useful. Using the k nearest neighbors to q to form a distribution may exploit relative information that may preserve ranking between data points during the training process, and may avoid the noise of irrelevant, far away points, such as might be present if all vectors are used as reference vectors to each sample vector q.

On the other hand, Applicant has realized that, using the entire training set as the basis to generate the k-NN reference sets may over-localize and overfit, which may, therefore, fail to reach the best generalized solution, besides being computationally almost infeasible when the training set is very large. Instead, a subset of 'proxy' points, enough to form a representation of the data distribution (e.g., around 10%), may be randomly sampled from the training set to create a 'proxy' vector set from which to extract nearest-neighbors as reference sets.

Applicant has realized that such proxy sets may be re-generated at each batch-iteration, to provide full augmentation and varieties of reference sets, for a more general solution. Moreover, ongoing subsampling of the training set may ensure a good representation of its distribution.

Figure 4E:
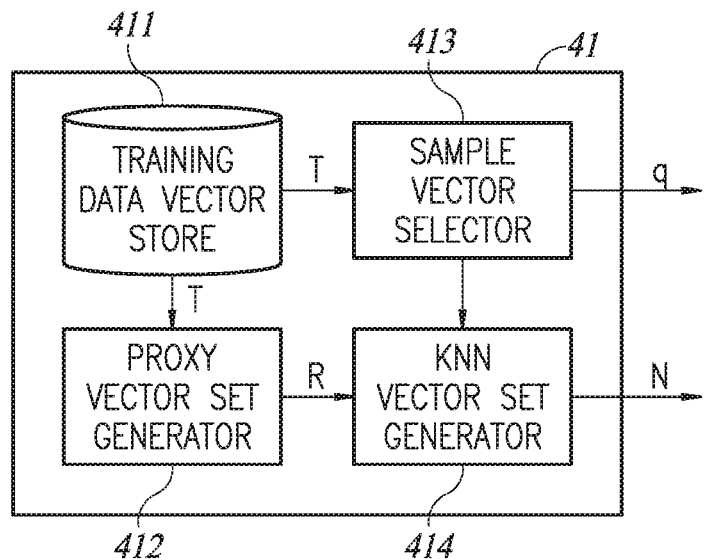
FIG. 4E is a schematic illustration of a training vector generator, useful in the NPH encoder of FIG. 4A.

Reference is made to FIG. 4E, which details training vector generator 41 comprising a training data vector store 411, a proxy vector set generator 412, a sample vector selector 413 and a KNN vector set generator 414. Training data vector data store 411 may store a full training vector set T, containing t training vectors. Proxy vector set generator 412 may create a 'proxy' vector set R, for each training iteration, by taking a large random sample of r vectors from T, such that R is a compact 'proxy' representation of T. 'r' is a configurable hyperparameter. For example, r may vary from 1% to 10% of t.

For each iteration, sample vector selector 413 may select a batch size b of sample vectors $q_j$ from the training set T. KNN vector set generator 414 may determine the set N of k nearest neighbor vectors $v_i$, to each vector q.

It should be noted that only one proxy vector set R may be generated during each iteration and it may be used to generate the reference vector sets N for the samples q of that iteration.

Figure 5A:
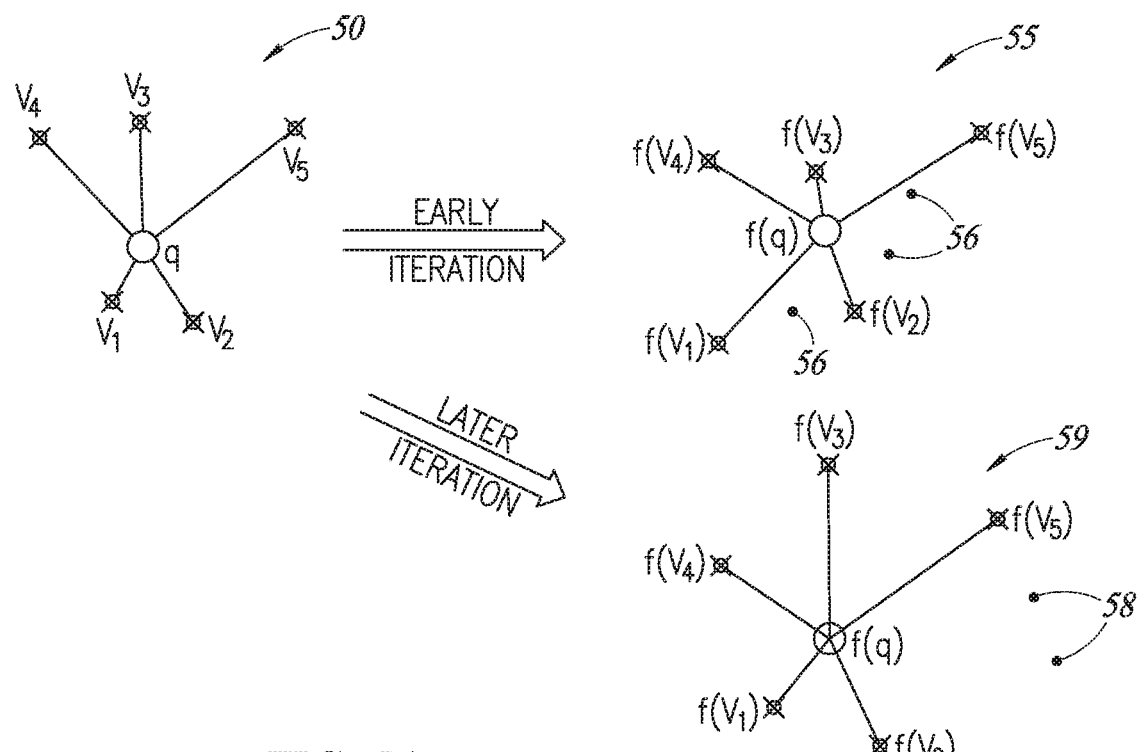
FIG. 5A is a graphical illustration of an exemplary input distribution and two exemplary output distributions from early and late iterations, respectively, useful in understanding the operations of NPH encoder of FIG. 4A.

Reference is briefly made to FIG. 5A which illustrates an exemplary input distribution 50, and two exemplary output distributions 55 and 59, where output distribution 55 shows the results of one of the early iterations of neural network under training 42 and output distribution 59 shows the results of one of the later iterations of neural network under training 42. For clarity, only two-dimensional spaces are shown and, for visual simplicity, the similarities are shown as Euclidean distances. Input vector q and its output vectors f(q) are shown, for clarity, as small circles, and their 5 associated reference vectors, $v_1$-$v_5$ and $f(v_1)$-$f(v_5)$, are shown as x's.

As can be seen, in input distribution 50, the 5 associated reference vectors, $v_1$-$v_5$ have different lengths, where reference vector $v_1$ is shortest (i.e., closest to input vector q) and reference vector $v_5$ is longest (i.e., further away from input vector q).

Early iterations generally produce poor results. As a result, the order of output reference vectors $f(v_i)$ of output distribution 55 is different than those of reference vectors $v_i$ of input distribution 50. Thus, output reference vector $f(v_3)$ is now the shortest though output reference vector $f(v_5)$ is still the longest. Moreover, while reference vectors $v_i$ of input distribution 50 may be the closest neighbors to input vector q, output reference vectors $f(v_i)$ of output distribution 55 are not the closest points. Unrelated points 56 of output distribution 55, marked with solid dots, are closer, indicating that neural network 42 is not yet fully trained.

However, training improves the results. Thus, in later output distribution 59, the order of output reference vectors $f(v_1)$-$f(v_5)$ is similar to that of reference vectors $v_1$ to $v_5$ of input distribution 50. Moreover, the unrelated points, here labeled 58, are further away from output vector f(q) than output reference vectors $f(v_1)$-$f(v_5)$.

Figure 5B:
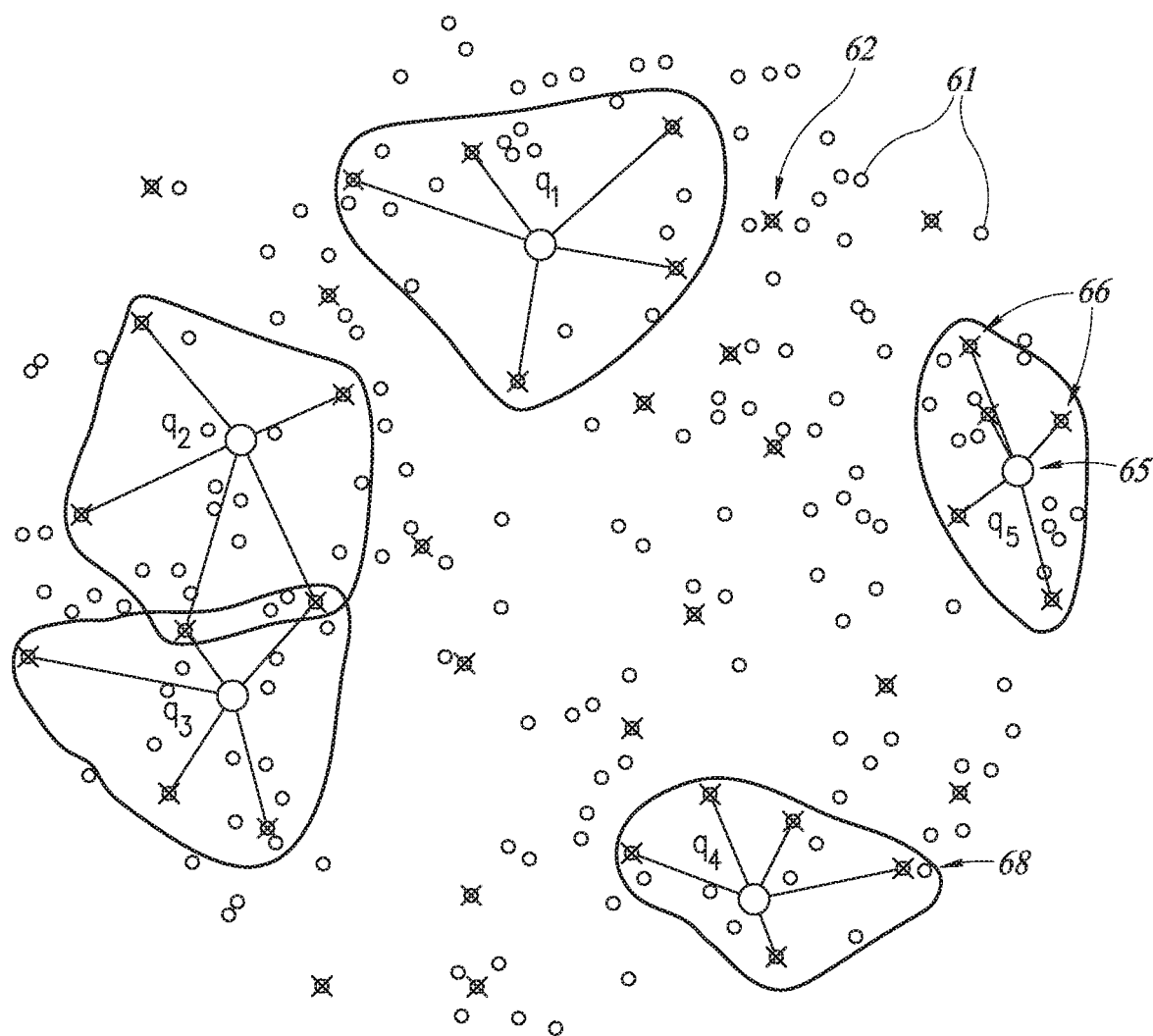
FIG. 5B is a graphical illustration of the distribution of input vectors in an exemplary training vector set, useful in understanding the operations of NPH encoder of FIG. 4A.

Reference is briefly made to FIG. 5B which illustrates an exemplary distribution of the input vectors in 2-D in training vector set T, each vector illustrated as a dot 61, that may be stored in training data vector store 411. A subset of r vectors, of proxy set R, illustrated with additional x's 62, represent vectors selected by proxy vector set generator 412. Sample vectors q, as selected by sample vector selector 413, are illustrated as large white dots 65, and k nearest neighbor vectors, $v_i$, as selected by vector set generator 414, are illustrated as x's 66 which are connected to the associated sample vector $q_j$, within a bounding circle 68. Note that the bounding circles 68 cover only portions of training vector set T and that some of the bounding circles 68 may overlap.

As mentioned hereinabove, when the neural network has been trained (i.e., when its loss value has converged), the resultant trained neural network may be used in inference mode in production. However, as mentioned hereinabove, in inference mode, the neural network encodes input floating-point vectors v into true binary encoded output vectors f(v), as opposed to the pseudo-bipolar encoded output vectors, generated during training.

Figure 6:
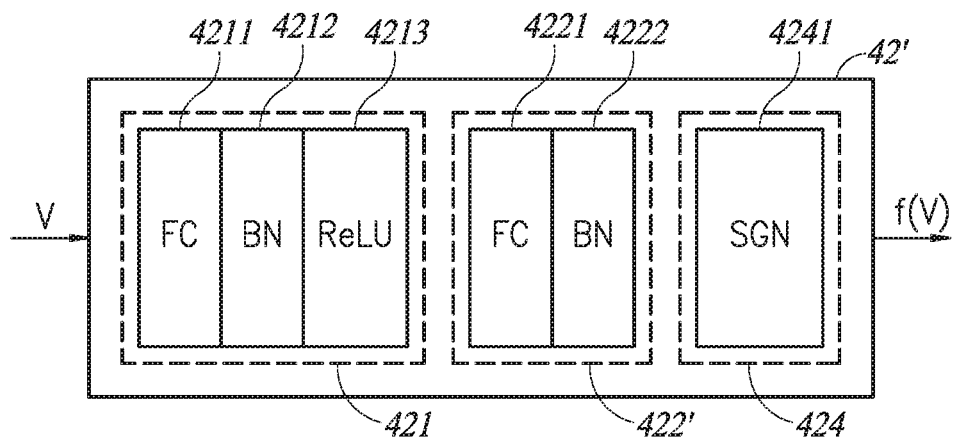
FIG. 6 is a schematic illustration of a neural network reconfigured for inference mode.

Reference is briefly made to FIG. 6 which illustrates a neural network 42', similar to neural network 42 in FIG. 4B but reconfigured for inference mode. Accordingly, all layers that were present in neural network 42, in order to output a pseudo-bipolar encoded vector, have been removed. L2-normalizer 4223 has been removed from embedding layer 422'. Bipolar simulator layer 423, comprising β-scaled function 4231 and tan h function 4232 layers, has been replaced with a binary output layer 424 comprising a SGN layer 4241. The resulting binary codes may be packed into bit-representation vectors (i.e., bit per value) for memory print reduction and computation efficiency.

Figure 7A:
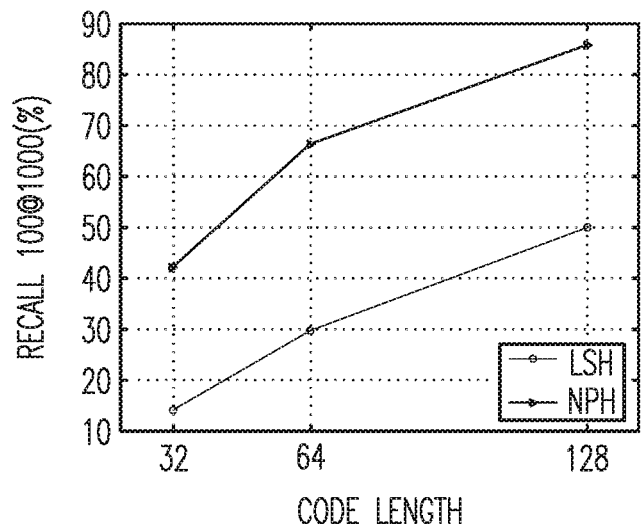
FIGS. 7A and 7B are graphical illustrations of recall-codelength curves for benchmark dataset Sift1M.
Figure 7B:
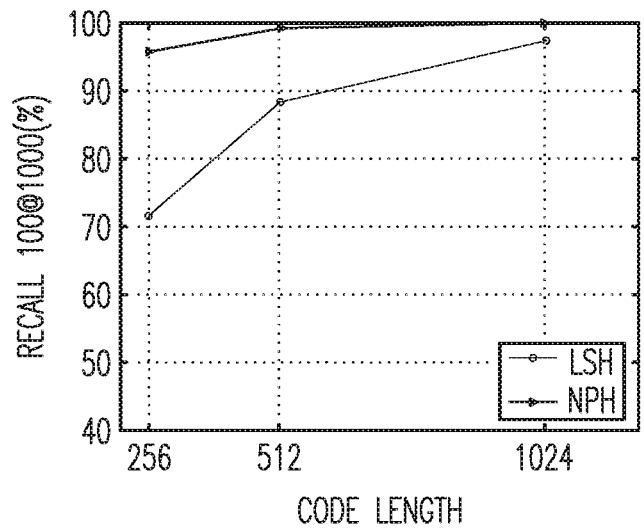

Reference is now made to FIGS. 7A and 7B which illustrate recall-codelength curves for benchmark dataset Sift1M. The encoder was trained on the predefined training set of 100k samples and evaluated on the predefined 10K sample set, searched against the 1M database set. Recall-K=100@L=1000 is an accuracy metric that can be used when evaluating similarity search. The ground-truth is the real 100-nearest neighbors in the original feature space using cosine similarity. Recall is the percentage from the k=100 real nearest-neighbors in the original space that reside among the L=1000 located samples with shortest Hamming distance in the binary space, averaged over all samples. Recall is calculated over several trained output code lengths. FIG. 7A illustrates recall-K=100@L=1000 over vector code lengths from 32 to 128 bits for Locality-Sensitive-Hashing (LSH) encoding and the Neural Proxy Hash (NPH) encoding of the present invention. FIG. 7B illustrates recall-K=100@L=1000 over vector code lengths from 256 to 1024 bits. Note that, in both figures, the NPH curve is significantly above the LSH curve, indicating a significant improvement over LSH.

It should be noted that, in testing with four publicly available standard ANN benchmark datasets (Sift1M, Gist, Deep1M, ANN1M), Applicant demonstrated improvement of between 7% to 17% over other binary hashing methods, in both low (64 bits) and high (1024 bits) code lengths. It should be noted that previous studies in this field report improvement in accuracy only over small code sizes (up to 128 bits). It will be appreciated that this offers increased accuracy when resources are available.

Unless specifically stated otherwise, as apparent from the preceding discussions, it is appreciated that, throughout the specification, discussions utilizing terms such as "processing," "computing," "calculating," "determining," or the like, refer to the action and/or processes of a general purpose computer of any type, such as a client/server system, mobile computing devices, associative processing units, smart appliances, cloud computing units or similar electronic computing devices that manipulate and/or transform data within the computing system's registers and/or memories into other data within the computing system's memories, registers or other such information storage, transmission or display devices.

Embodiments of the present invention may include apparatus for performing the operations herein. This apparatus may be specially constructed for the desired purposes, or it may comprise a computing device or system typically having at least one processor and at least one memory, selectively activated or reconfigured by a computer program stored in the computer. The resultant apparatus when instructed by software may turn the general purpose computer into inventive elements as discussed herein. The instructions may define the inventive device in operation with the computer platform for which it is desired. Such a computer program may be stored in a computer readable storage medium, such as, but not limited to, any type of disk, including optical disks, magnetic-optical disks, read-only memories (ROMs), volatile and non-volatile memories, random access memories (RAMs), electrically programmable read-only memories (EPROMs), electrically erasable and programmable read only memories (EEPROMs), magnetic or optical cards, Flash memory, disk-on-key or any other type of media suitable for storing electronic instructions and capable of being coupled to a computer system bus. The computer readable storage medium may also be implemented in cloud storage.

Some general purpose computers may comprise at least one communication element to enable communication with a data network and/or a mobile communications network.

The processes and displays presented herein are not inherently related to any particular computer or other apparatus. Various general-purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the invention as described herein.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method for training a neural-network-based floating-point to binary feature vector encoder to preserve locality relationships between samples in an input space over to an output space, the method comprising:

having a neural network under training having floating-point inputs and floating-point pseudo-bipolar outputs; and generating a loss function which compares an input probability distribution constructed from floating-point cosine similarities of said input space and an output probability distribution constructed from floating-point pseudo-bipolar pseudo-Hamming similarities of said output space.

2. The method of claim 1 wherein said generating comprises calculating said output probability distribution between a floating-point pseudo-bipolar encoded sample vector and a set of pseudo-bipolar encoded reference vectors.

3. The method of claim 2 and also comprising:

taking a random sampling of a plurality of vectors from a training vector set, thereby to generate a representative proxy vector set;

selecting said sample vector from said training vector set; and finding a set of k nearest neighbor vectors from said proxy vector set, closest to said sample vector, thereby to generate a reference vector set to be encoded by said encoder.

4. The method of claim 3 and also comprising repeating said taking for each training iteration.

5. The method of claim 3 and also comprising repeating said selecting multiple times per training iteration thereby generating a plurality of sample vectors for each training iteration.

6. The method of claim 5 and also comprising repeating said finding thereby generating a plurality of said reference vector sets, one per sample vector of said plurality of sample vectors, for each training iteration.

7. The method of claim 1, wherein said generating comprises calculating said loss function using a Kullback-Leibler divergence from said input probability distribution and said output probability distribution.

8. The method of claim 2, wherein for training, said neural network includes an output layer which generates said floating-point pseudo-bipolar encoded sample and reference vectors using a beta-scaled tan h layer.

9. The method of claim 1, wherein said generating comprises calculating said pseudo-Hamming similarities using an inner product in said output space.

10. The method of claim 1, wherein said generating comprises normalizing said cosine similarities and said pseudo-Hamming similarities to be within the same range of values.

11. The method of claim 10 and wherein said normalizing comprises normalizing said pseudo-Hamming similarities using a binary code length.

12. The method of claim 10 and wherein said normalizing comprises converting said cosine similarities and said pseudo-Hamming similarities to probabilities.

13. The method of claim 1, and also comprising, once said neural network is trained, producing an inference neural network from said trained neural network, said inference neural network to output true binary vectors.

14. The method of claim 13 wherein said producing comprises:

removing pseudo-bipolar output layers from said trained neural network; and adding at least one binary output layer to said trained neural network, to generate said inference neural network.

15. The method of claim 13 wherein said true binary vectors to be used in approximate nearest neighbor searches.

* * * * *